United States Patent [19]

Meunier et al.

[11] Patent Number: 4,897,747
[45] Date of Patent: Jan. 30, 1990

[54] WRITE/READ HEAD INCLUDING MONOCRYSTALLINE MAGNETIC THIN FILMS PROTECTED BY A COATING HAVING HARDENED AND LUBRICATING ZONES

[75] Inventors: Paul-Louis Meunier, Paris; Manijeh Razeghi, Gif sur Yvette; Jean-Luc Rolland, Paris, all of France

[73] Assignee: Thomson-CSF, Paris, France

[21] Appl. No.: 164,133

[22] Filed: Mar. 4, 1988

[30] Foreign Application Priority Data

Mar. 6, 1987 [FR] France ............... 87 03073

[51] Int. Cl.⁴ ............................................. G11B 5/187
[52] U.S. Cl. ..................................... 360/122; 360/126
[58] Field of Search ............... 360/122, 125, 126, 127

[56] References Cited

U.S. PATENT DOCUMENTS

| 3,683,126 | 8/1972 | Krause | 360/122 |
| 4,130,847 | 12/1978 | Head et al. | 360/122 |
| 4,345,367 | 8/1982 | Chase | 360/122 |
| 4,589,043 | 5/1986 | Grundtner | 360/122 |
| 4,644,431 | 2/1987 | Kishino et al. | 360/122 |
| 4,706,146 | 11/1987 | Dohmen et al. | 360/122 |

FOREIGN PATENT DOCUMENTS

| 55-142409 | 11/1980 | Japan | 360/122 |
| 58-141428 | 8/1983 | Japan | 360/122 |

Primary Examiner—John H. Wolff
Assistant Examiner—Matthew J. Bussan
Attorney, Agent, or Firm—Oblon, Spivak, McClelland, Maier & Neustadt

[57] ABSTRACT

In a method for making a thin-film magnetic head, there are stages for depositing hardening material in the plane of the magnetic films and in the neighbourhood of the active surface of the magnetic head. The invention also relates to a magnetic head made according to this method. The invention can be applied to thin-film magnetic heads for magnetic tape read/write devices.

2 Claims, 4 Drawing Sheets

FIG_1
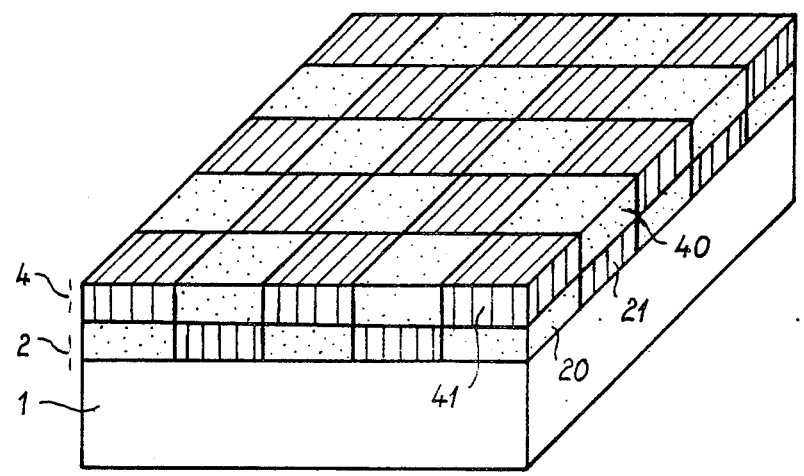
FIG_2
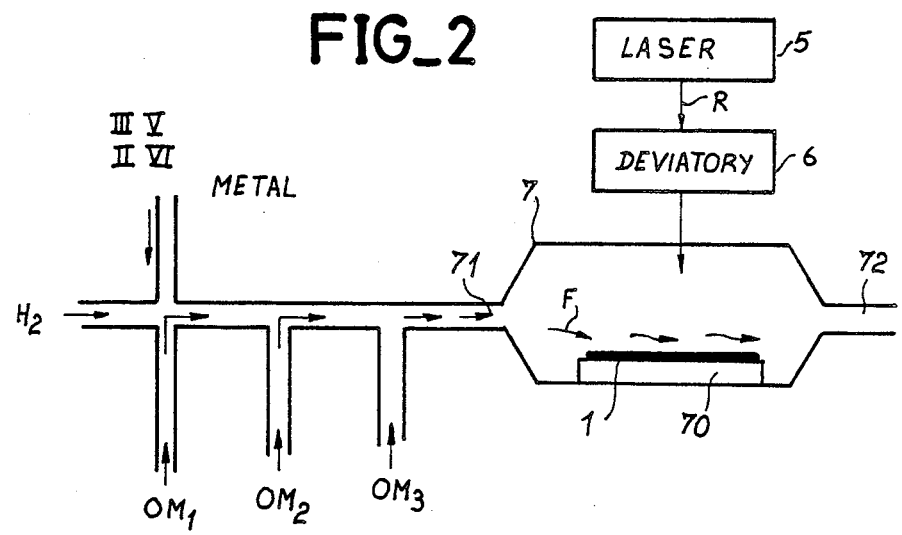

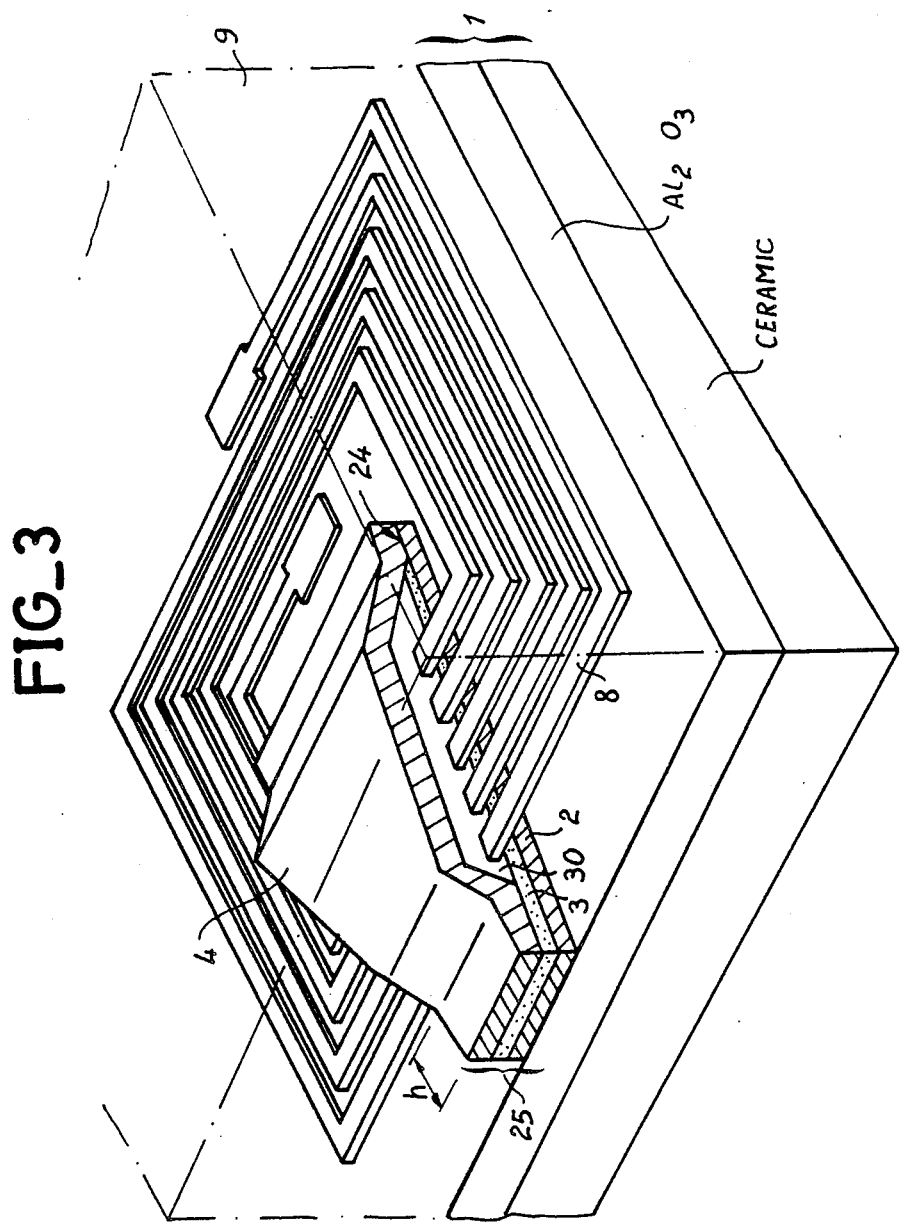
FIG_3

FIG_4
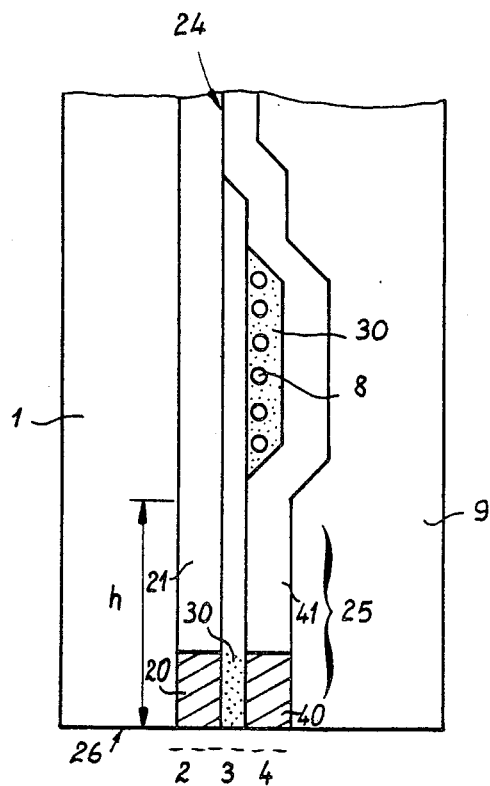

FIG_5
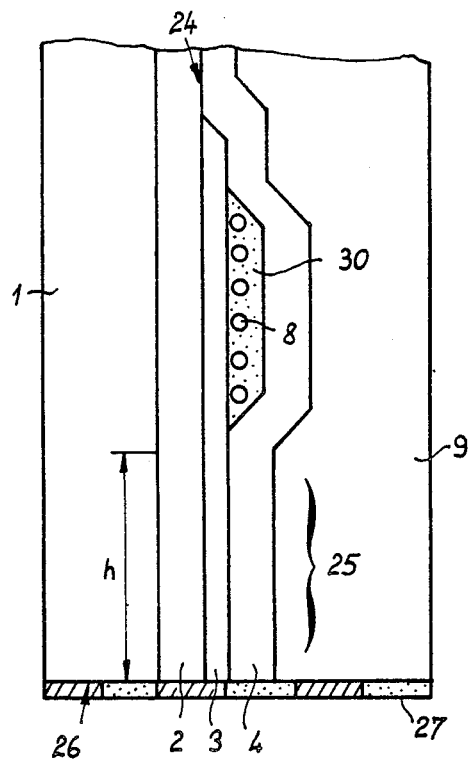
FIG_6
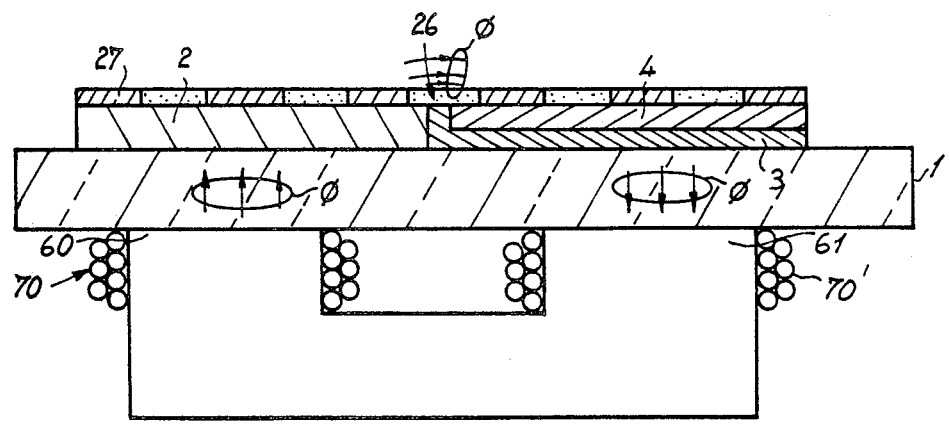

WRITE/READ HEAD INCLUDING MONOCRYSTALLINE MAGNETIC THIN FILMS PROTECTED BY A COATING HAVING HARDENED AND LUBRICATING ZONES

BACKGROUND OF THE INVENTION

1. Field of the Invention

The invention relates to a method for making a thin-film magnetic head having different materials depending on the zones of the film. It also relates to a write/read head made according to this method.

2. Description of the Prior Art

With prior art methods, when making thin films which may be about 2 to 5 micrometers thick, it is not possible to obtain, in one and the same film, zones of a determined composition next to zones of a different composition, with distinct boundaries between the zones. According to the invention, a structure of this type, where certain zones have harder materials, forms a structure offering greater resistance to surface wear.

This structure can be applied preferably to a write/read magnetic head.

Integrated magnetic heads are presently produced as read or write elements for hard disks. In this context of their use, the magnetic heads fly above the surface of the disk. Their flying height is about 0.3 micrometers and, while they are being used, they never rub against the disk except when this disk is being started or stopped.

By contrast, in video tape recorder type devices, the writing medium is a magnetic tape made of either oxide or metal, and the heads are in contact with the tape. The result of this is a rate of wear which, according to present standards for VHS heads, is about 20 micrometers per 2000 hours of functioning, thus establishing the lifetime of the video tape recorder.

For thin-film heads, the problem of the interface between the tape and the write/read head is more crucial because it involves dimensions in the range of a few micrometers for the active magnetic parts. For the thin-film deposits have thicknesses of about 5 micrometers, and the gap is 0.2 micrometers, the substrate on which the films are deposited being about 500 micrometers thick.

Hence, there are reasons for taking precautions against the premature wearing out of these magnetic heads.

The magnetic thin films presently in the market are made by the cathodic sputtering of materials such as Fe and Ni, or mixtures such as FeSiAl. The structure that results from cathodic sputtering is a polycrystalline and locally non-homogeneous structure.

By contrast, the making of constituent elements of this type entails using, according to the invention, a known technique for epitaxial depositing by laser heating as described in the article: "Laser Selective Depositing of GaAs on Si" by S. M. Bedair et al in the journal Applied Physics Letter, No. 48(2), Jan. 13th 1986.

The technological flexibility of the method of the invention makes it possible to envisage structures with adjacent or stacked deposits, suited to the use for which the magnetic head is designed.

SUMMARY OF THE INVENTION

The invention therefore relates to a method for making a thin-film magnetic head, said method including the following stages:
  at least one first stage for depositing first zones on a substrate, using a mixture containing hardening constituents;
  at least one second stage for depositing second zones on the substrate, using a mixture containing constituents that optimize the magnetic characteristics of the material;
  a third stage for depositing a film of a non-magnetic material on the first and second zones;
  a fourth stage for making an induction coil;
  at least one fifth stage for depositing third zones on the film of non-magnetic material, said third zones corresponding to the first zones, by means of a mixture containing hardening constituents
  at least one sixth stage for depositing fourth zones on the film of non-magnetic material, said fourth zones corresponding to the second zones, by means of a mixture containing constituent elements that optimize the magnetic characteristics of the material.

The invention also relates to a thin-film magnetic write/read head having the following, deposited successively on a substrate: a first film of a magnetic material, a film of a non-magnetic material, a second film of a magnetic material, said magnetic head having a side with which the various films are flush, said side forming an active write surface against which moves a magnetic writing medium, wherein the first and second films of magnetic material have, in a first zone and a third zone that are next to said side, a hardening material that increases the resistance to wear of the magnetic head.

BRIEF DESCRIPTION OF THE DRAWINGS

The various objects and characteristics of the invention will be seen more clearly from the following description which is made with reference to the appended figures, of which:
  FIG. 1 shows an embodiment of a structure of abrasion-resisting films according to the invention;
  FIG. 2 shows an example of equipment used to implement the method of the invention;
  FIGS. 3 and 4 show an embodiment of a write/read magnetic head according to the invention;
  FIG. 5 shows an alternative embodiment of a magnetic head according to the invention;
  FIG. 6 shows an embodiment of a planar magnetic head according to the invention.

DETAILED DESCRIPTION OF THE INVENTION

The design of the thin-film structure, where the various films consist of distinct zones with different compositions, can be applied, for example, to thin-film magnetic write/read heads.

FIG. 1 shows an embodiment of a thin-film structure comprising the following on a substrate 1: a first thin film 2 made up of several zones 20, 21 and a second thin film 4 made up of several zones 40, 41.

The various zones of the films 2 and 4 are made with different materials. According to the embodiment shown in FIG. 1, there are two types of zones for each of the two films 2 and 4. There are dotted zones, such as 20 and 40, and haunched zones 21 and 41.

The zones 20 and 40 are made of a hardened material for example. The zones 21 and 41 are made of magnetic material. The thickness of each film 2 and 4 may range between some hundreds of angstroms and about 5 micrometers, all depending on the magnetic characteristics of 21 and 41. Each zone is shown in the form of a square which may have a side of a few micrometers to some tens of micrometers. However, the shape of the zones may differ according to the application considered.

Depending on the type of application, the zones with different compositions of the two films 2 and 4 may be located opposite each other, with the zone 20 of film 2 opposite the zone 41 of the film 4 and the zone 21 of the film 2 opposite the zone 40 of the film 4.

To make a structure thus described, the device used is one that can perform metal organic chemical vapor deposition (MOCVD). This device, shown in FIG. 2, has a chamber or reactor having a susceptor 70 on which the substrate 1 is placed. The chamber has an inlet 71 and an outlet 72. Gas inlet conduits are connected to the inlet 71. These various conduits feed the inlet 71 with metal organic mixtures, OM1, OM2 . . . OM5, each containing an element such as, for example, nickel for OM1, silicon for OM2, iron for OM3, aluminum for OM4 and chromium for OM5. Other conduits are used to supply hydrogen or type III-V or II-VI compounds or metals.

A laser source 5 gives a light beam R which provides localized heating, at the substrate 1, of the fluid F coming from the inlet 71. A deflector 6 deflects the beam R and moves the heating point of the beam on the substrate so as to scan an entire zone. This scanning can be controlled by a computer program. The heating time of each point must be optimized, and may range from a few milliseconds to a few seconds.

In the case of zones distributed over a substrate with a large area, it is provided that, after one or more zones have been scanned, the substrate will be shifted with respect to the laser source so that other zones are scanned.

To deposit zones with different compositions, firstly zones of a specific nature are deposited using an appropriate gas mixture. Then, when all the zones of the same nature have been implanted, the chamber is blown off and other zones are deposited with another gas mixture.

For a checkerboard structure, such as the one shown in FIG. 1, the substrate can be moved with respect to the laser by successive linear movements and by rotating the substrate on itself. The laser beam could also be moved while keeping the substrate fixed or there could be a combination of movements of the laser and the substrate.

For an application of the method to an abrasion-resisting film, the operation starts with the substrate plate 1, then heat is applied in a checkerboard pattern with squares having dimensions that are compatible with the laser spot (10A x 10A), this operation being done under gases (ethylenes, methylenes, etc.) to perform the deposition. Then the laser beam path is reinitialized to describe another checkerboard pattern, complementary to the previous checkerboard pattern, to deposit Si by injecting silane. Either the substrate or the laser or both together can be made to move and rotate along the desired configuration.

Laser MOCVD epitaxy can thus be used to make monocrystalline deposits that are very localized both on surfaces and in depth. The gases present decompose on the part heated (to a few hundreds of degrees C.) by the laser, and the growth is proportional to the time during which the concerned part is illuminated.

The advantage of the method thus described is that it requires no masking operation.

Referring to FIGS. 3 and 4, we shall now describe an example of the application of the above-described structure to the making of a magnetic write/read head.

For example, an integrated magnetic head for video applications, namely one that runs at 5 m/s on a oxide or metal magnetic tape, should withstand wear at the part in contact with the tape, and should have the greatest possible magnetic permeability near the tape to improve the signal/noise ratio. This is why the invention relates a magnetic head structure that resists this kind of wear.

In FIG. 4, it can be seen that a thin-film magnetic head of this type has the following on a substrate 1 consisting, for example, of an aluminum film deposited on a ceramic piece: a first film 2 of magnetic material lined with a film 3 of non-magnetic material. A flat coil 8 overlaps the magnetic film 2. A second film 4 of magnetic material, insulated from the coil 8 by an insulating material 30, lines the first magnetic film. The two magnetic films 2 and 4 are in contact with each other at the center of the coil 8 and have a common zone 24 which enables the magnetic flux to pass through. The active part 25 of the head is on the side opposite to the zone 24. The two films 2 and 4 are separated by the film of non-magnetic material 3 and the magnetic circuit is open, the film 3 determining the gap of the magnetic head. When passing before the active part 25, a magnetic medium is used to write or read data by means of the coil 8. To complete the magnetic head, a piece of substrate 9 is made to cover the entire film 4 and the coil 8 by bonding.

In prior art heads, the active part is a few micrometers thick (5 micrometers for example) and has a height h of a few tens of micrometers (20 to 50 micrometers for example). According to the invention, this active part has zone 20 and 40 made of hardened material. In FIG. 4, these zones are located at the end of the active part 25 of the head, and are made in the films 2 and 4.

According to the method described earlier, these zones are made by epitaxial deposition which enables the hardening of the film mechanically by CSi doping for example. This doping entails a compromise between the deterioration of magnetic properties and greater mechanical hardness.

It must be noted that the non-hardened films 2 and 4 may have excellent mechanical properties. The magnetic performance characteristics of the films made are reproducible. As described earlier, the metal organic compounds and hydrides are decomposed with a laser ray so as to induce controlled monocrystalline growth in an area smaller than a few $um^2$. Thus, oriented monocrystals of different materials are made beside one another.

The films 2 and 4 are each made in the form of a strip bordering the magnetic head end 26 which is in contact with a magnetic support.

As shown in FIG. 4, the film of non-magnetic material 3 can also be hardened in a zone 30.

According to an alternative embodiment of a magnetic head according to the invention, as shown in FIG. 5, the films 2 and 4 have no hardened zone. By contrast, the surface 26 of the active part 25 of the head is coated with a film 27 of non-magnetic material. This film 27 has zones made of hardened material which increases the resistance to wear, such as the hachured zones of this film, and zones made of lubricating material having a lower coefficient of friction than the zones made of hardened material, such as the dotted zones. According to one embodiment, these zones may be arranged in a checkerboard pattern.

A write/read magnetic head thus described may be made according to the same method as the one described earlier, by laser heating epitaxial deposition. Magnetic heads may be obtained by this method with a 100 um$^2$ laser beam spot, a scanning speed of 50 micrometers per second and a depositing speed of 100 angstroms per minute. To obtain greater thickness, it is enough to change the power of the laser or the quantity of metal organic compounds supplied by the reactor.

FIG. 6 shows an alternative embodiment of the invention wherein the magnetic head is a planar head coated with an abrasion-resistant film 27 made up of zones of hard material and zones of lubricating material.

According to an alternative method for making the magnetic head, the epitaxy of the various films is done without laser beams, i.e. by the usual method for metal organic chemical vapor deposition (MOCVD) or by a molecular electron beam (MEB) deposition method.

The MOCVD (or MBE) method can be used, by means of the conveying gas, to deposit atoms of Fe, Mi, Al, Si, Mo, Co etc. on the substrate in monocrystalline form. Thus, the proposed thin-film structure (video heads, Winchester heads etc.) will be a stack of monocrystalline films (NiFe/Al$_2$O$_3$/NiFe for example).

The zones with different compositions are made by masking. To make a film certain zones are masked and an epitaxial deposition is done on the other zones using specific compounds. Then the masked zones are unmasked, and the zones that have previously undergone deposition are masked. Finally, another deposition is made on the unmasked zones, using different compounds.

Thus the first film 2 of the magnetic head is made. Then, a film of non-magnetic material 3 is deposited. The coil 8 is made and covered with an insulating material 30. Then the second film 4 is deposited in the same way as the film 2. Finally, the entire unit is covered with a substrate 9, by bonding, to complete the magnetic head.

Thus, a head is obtained with greatly improved physical characteristics, derived from monocrystalline deposition, and the resultant magnetic moment, in particular, may reach a value of ten times the value given by other methods such as cathode sputtering.

In the practical embodiment of the heads, the active part of the head will be longer (h$\simeq$ 20 to 50 $\mu$m) contributing to the greater quality of the magnetic circuit and thus making problems of wear less crucial. There is also a gain in the number of turns, i.e. this number can be divided by two, while preserving the same efficiency in the head.

For example, films 2 and 4 may be 2 to 5 micrometers thick and the film 3 may be 0.2 to 0.3 micrometers thick.

It is obvious that the above description has been given only as a non-restrictive example, and that other alternatives may be envisaged without going beyond the scope of the invention. The digital values have been given only to illustrate the description and to embody the invention for those skilled in the art.

What is claimed is:

1. A read/write thin-film magnetic head comprising the following, deposited successively on a substrate: a first monocrystalline film of a magnetic material, a film of a non-magnetic material, a second monocrystalline film of a magnetic material, said magnetic head having a side with which the various films are flush, said side forming an active write surface against which moves a magnetic writing medium, wherein the active write surface is coated with at least one film of a material having hardened zones and lubricating zones stacked in two dimensions or three dimensions, wherein said lubricating zones have a lower coefficient of friction than said hardened zones and said hardened zones increase the head's resistance to wear.

2. A read/write thin-film magnetic head according to claim 1, wherein the at least one film coated on the active writing surface is made up of alternative stacks of hardened zones and lubricating zones.

* * * * *